June 19, 1934. C. L. HOBART 1,963,327
COUNTER
Filed Aug. 13, 1930 4 Sheets-Sheet 1
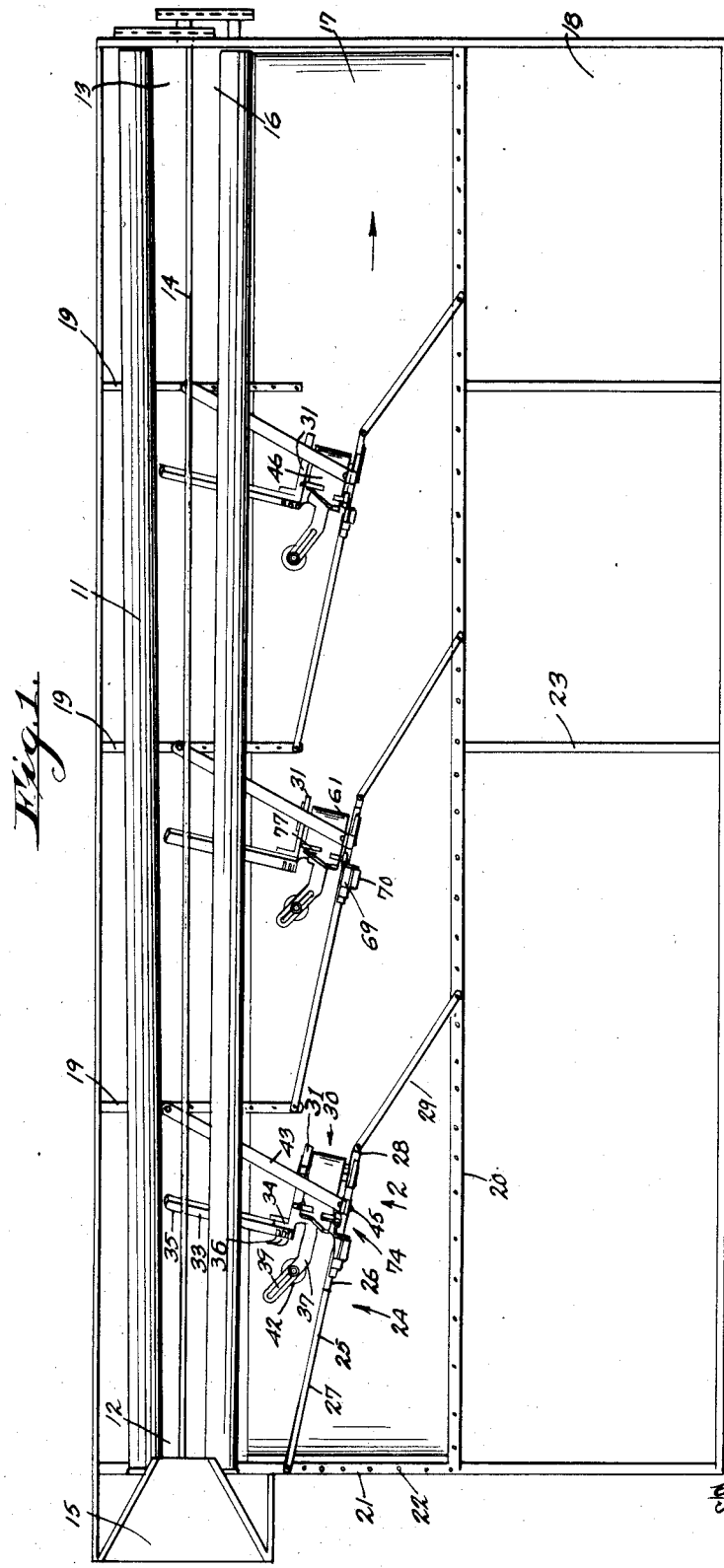

June 19, 1934.   C. L. HOBART   1,963,327
COUNTER
Filed Aug. 13, 1930   4 Sheets-Sheet 2
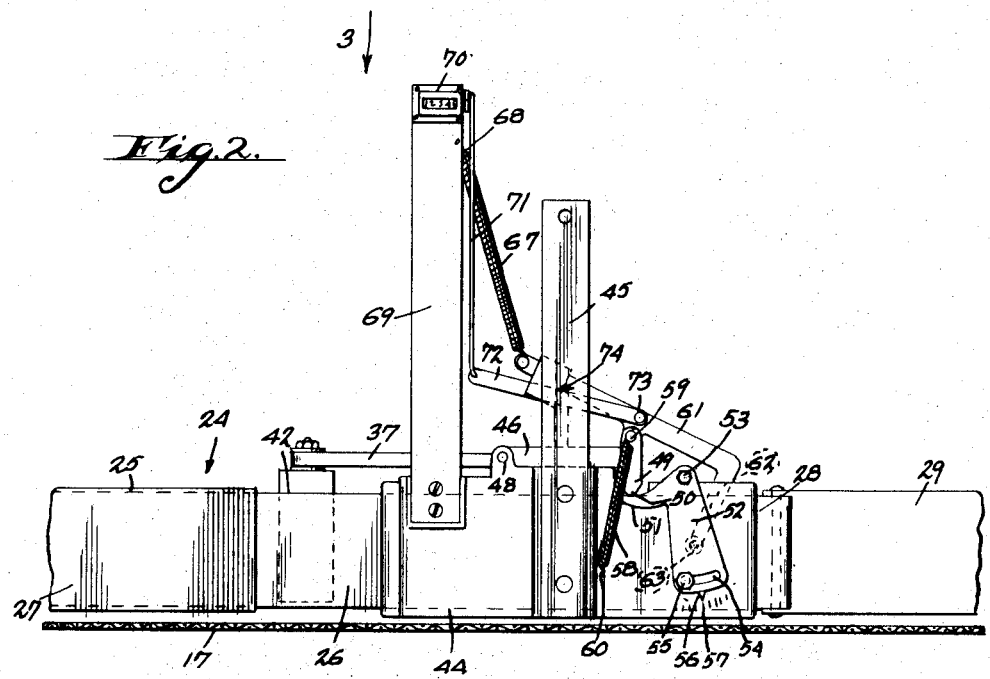
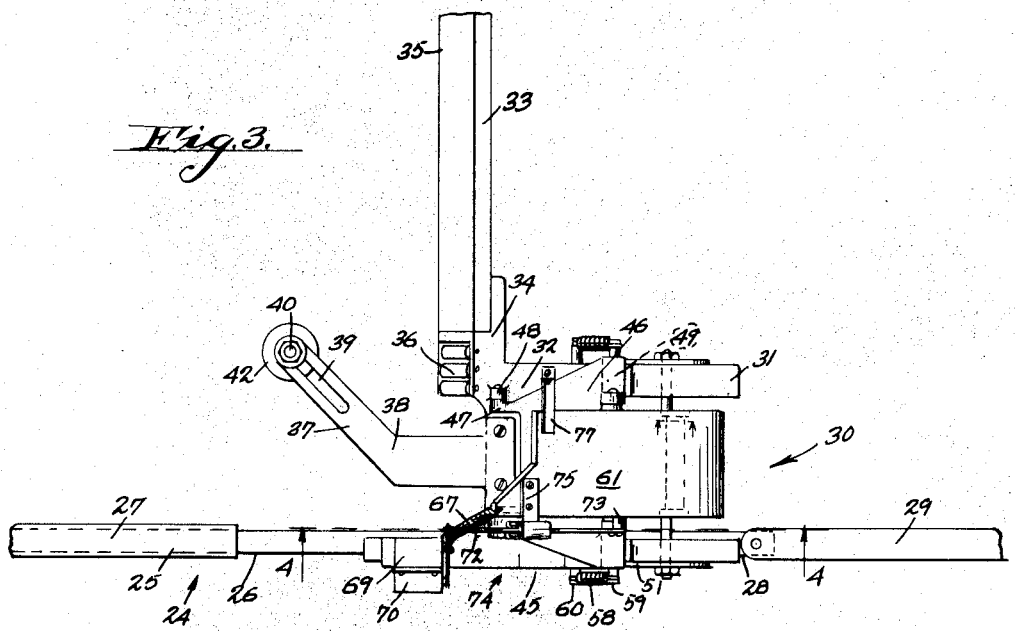
Inventor
Clarence L. Hobart.
by Hazard and
Miller
Attorneys

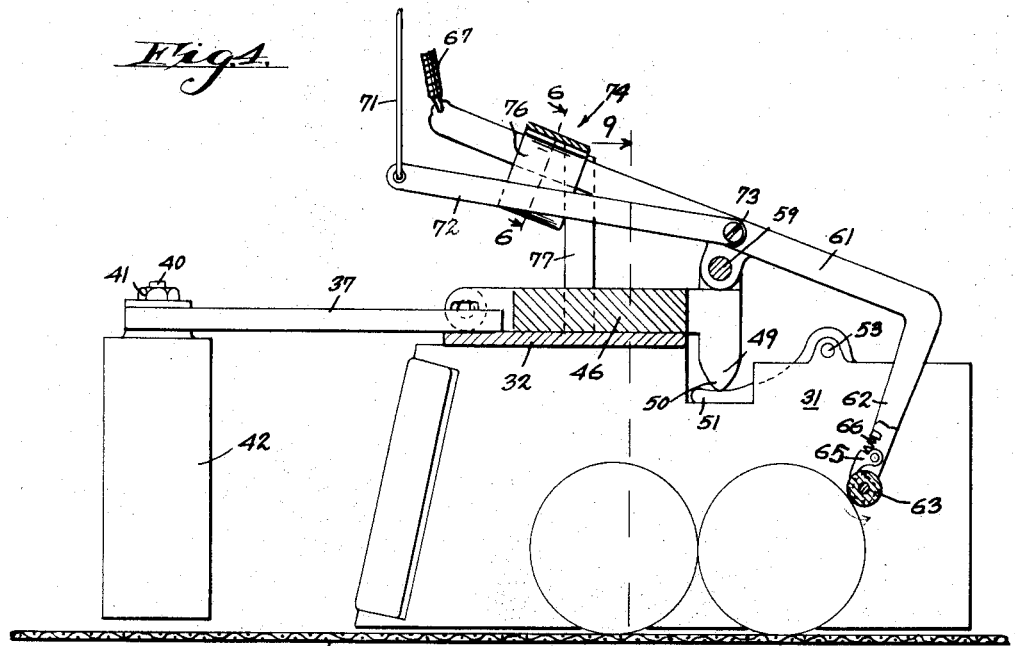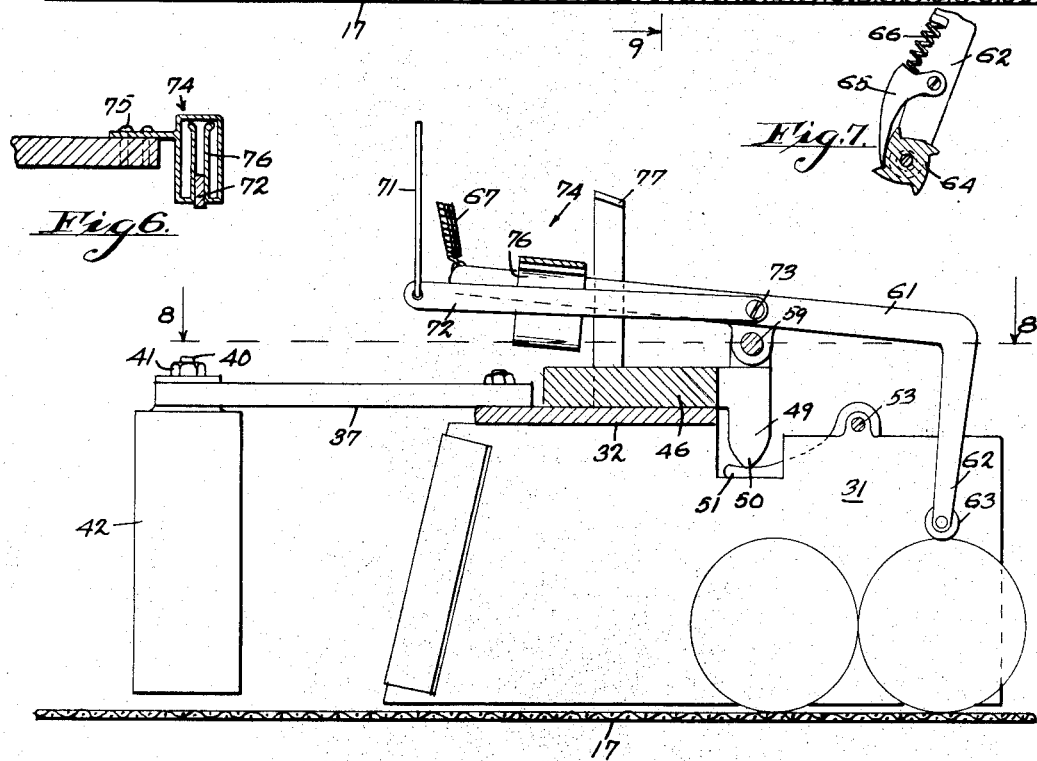

June 19, 1934.                C. L. HOBART                1,963,327
                                COUNTER
                         Filed Aug. 13, 1930          4 Sheets-Sheet 4

Inventor
Clarence L. Hobart.
by Hazard and Miller
Attorneys

Patented June 19, 1934

1,963,327

UNITED STATES PATENT OFFICE 1,963,327

COUNTER

Clarence L. Hobart, Riverside, Calif., assignor to Electric Fruit Marking Company, Los Angeles, Calif., a corporation of California Application August 13, 1930, Serial No. 474,971

29 Claims. (Cl. 235—98)

My invention relates to a counter for counting fruits or vegetables or the like which pass through grading machines, my invention being principally adapted for counting substantially round fruit, such as oranges, after being sorted into different sizes and as such fruit is being deposited into the bins for packing.

An object of my invention is the construction of a diverting device above an endless moving belt which carries the fruit from the size grading device, and this diverter causes the rolling of the fruit into the bins from which it may be packed. The diverter is provided with a passage or channel through which the fruit must pass, and this channel is provided with a striker, such striker being engaged by each article passing through the channel and actuating a counting device. In this way, by employing a counter for each different size of fruit, I may obtain an accurate counting of each grade passing through the machine.

Another object and feature of my invention is forming the diverter so that it may be adjustable as regards the size grading machine and also as regards the bins to accommodate a large or small run of fruit of any particular size. Such adjustment may be made without interfering with the counting action.

Another object and feature of my invention is the employment in the diverter of a separating device which will prevent packing or jamming of the fruit adjacent the channel having the counting mechanism. This separator is adjustable and is adapted to force the fruit to pass along one side or the other of such separator. The separator employs a roll so that the moving fruit cannot jam against such roll. The roll is located spaced slightly from the entrance to the channel having the counter through which the fruit must pass so that there is no danger of the fruit bridging and blocking the entrance to this channel.

Another feature of my invention in connection with the diverter is having one side wall which extends longitudinally at a slight angle to the direction of movement of the endless belt, and in cooperation with this there is another diverting wall which is almost at right angles to the run of the fruit, but as the belt has an inclination to one side, the wall, which is nearly right angular, on account of having the inclination, diverts the fruit toward the discharge channel, which is between the two walls, and this upper wall is provided with a series of rollers adjacent the channel entrance, thus facilitating the movement of the fruit and preventing the blocking and bridging.

A further feature and object of my invention in the employment of the striker which is engaged by the fruit, is to have a slip connection whereby the striker may be operated by fruit which is of different diameter and different circumference so that when fruit has been graded according to one size of diameter the striker will operate on such fruit or fruit varying therefrom by a considerable margin, being of greater or lesser diameter. This striker employs a friction or slip connection to the counter and thus, if the fruit is too large, the slip connection operates and allows the fruit to pass underneath the striker.

My invention is illustrated in connection with the accompanying drawings in which:

Fig. 1 is a plan of part of a grading machine showing my counters located over the traveling belt and feeding to different bins.

Fig. 2 is a side elevation of a single counter taken in the direction of the arrow 2 of Fig. 3.

Fig. 3 is a plan of Fig. 2 taken in the direction of the arrow 3.

Fig. 4 is a vertical section on the line 4—4 of Fig. 3 in the direction of the arrows, illustrating the striker in one position.

Fig. 5 is a view similar to Fig. 4 showing the striker in another position.

Fig. 6 is a detail section on the line 6—6 of Fig. 4 in the direction of the arrows showing the slip action of the striker lever.

Fig. 7 is a detail section illustrating the ratchet on the striker roll.

Figure 8:
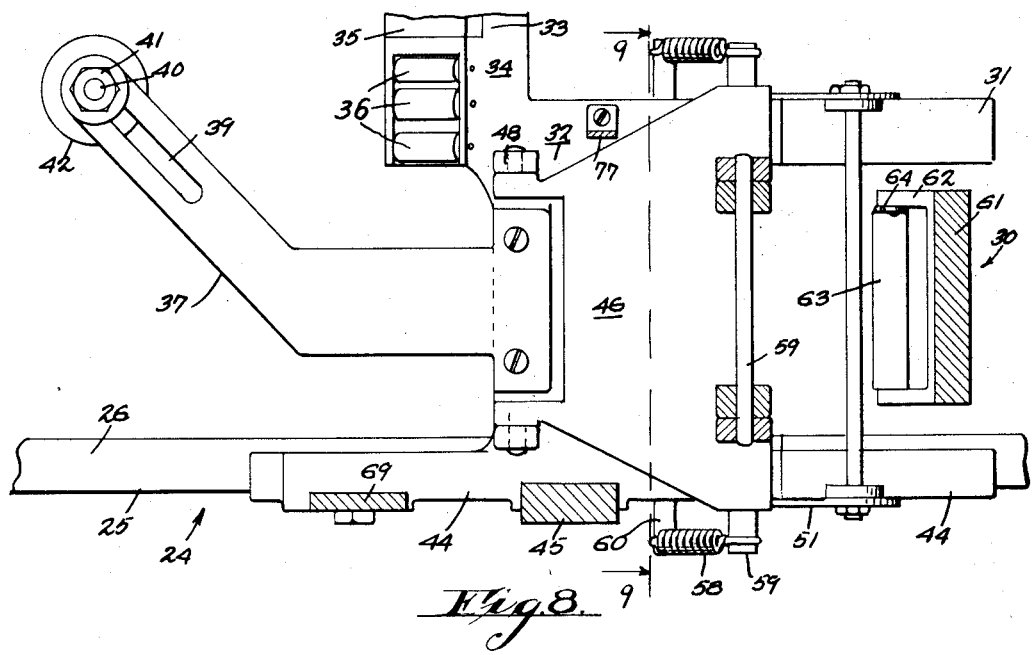
Fig. 8 is a section on the line 8—8 of Fig. 5, and Fig. 9 a section on the line 9—9 of Fig. 8 in the direction of the arrows.
Figure 9:
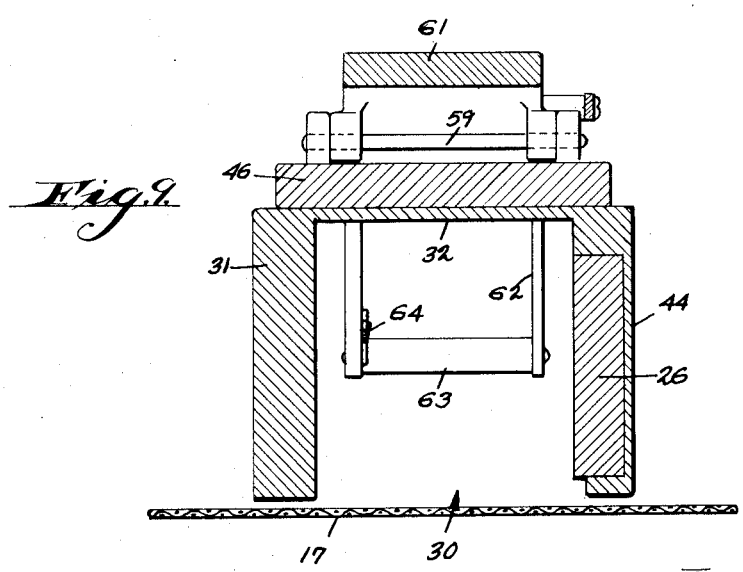

In the drawings, referring first to Fig. 1, the grading part of the machine is indicated as having two long rollers 11 which diverge from the in-feeding end 12 to the outer end 13. There is a spacing rod 14 between these rollers and the fruit drops between the spacing rod and the rollers. The fruit is fed in by the chute 15 and the rollers are rotated in the usual manner to rotate the fruit so that the small sizes will pass through first near the in-feeding end and the larger sizes toward the outer end. The fruit drops on an inclined table 16 underneath the rollers and from this table it runs on to an endless belt 17 which is also inclined, the belt being tilted downwardly toward the bins 18. There are a series of partitions 19 positioned transversely of the table 16, and a spacing bar 20 extends longitudinally at one side of the belt. At the forward end of the belt there is an end bar 21, and each of the bars 19, 20, and 21 has a series of sockets or perforations 22 for pegging the diverters. The bins also have adjustable partitions 23 by which the size of the bins may be varied in accordance with the sizes of the fruit being graded.

The counter has what may be termed a diverter 24 which has a side wall 25. The forward end of this side wall is illustrated as being connected by a peg to the end 21 at the end of the belt, and for the other diverters the end is connected to the partitions 19. This wall is formed with a board 26 which fits into a rectangular hollow casing or tube 27. This gives a telescopic fit so that the sides 25 may be increased or decreased in length.

Extending from the rear end 28 of each of these diverter walls 25 there is a guide wall 29 which is pegged in one of the perforations 22 in the spacing bar 20. This may be adjusted in accordance with the sizes of the fruit to feed in the different bins.

An outfeeding channel designated at 30 is formed by a board 31 which is held parallel to the rear portion of the side 25 by having a block 32 extending from the board 26 to the board 31. A second diverting board 33 is secured preferably by a bracket 34 to the channel board 31, and this extends across part of the belt 17 slightly inclined to the transverse position. This board 33 also is tilted, the inclined face 35 being toward the intake end of the machine. A series of rollers 36 are positioned or mounted in the bracket 34 which supports the board 33.

In order to prevent jamming of the fruit at the entrance to the channel, I employ a separating arm 37 which is preferably attached to the transverse block 32 and has an angular bend 38. This has a slot 39 with a vertical axle 40 adjustably mounted in this slot, the axle being clamped in position by a nut 41, and on this axle there is a loose roller 42.

In order to maintain the diverter with the outfeeding channel in proper position, a retaining bar 43 is connected between one of the holes in the transverse partition 19 and is attached adjacent the end of the board 26 forming part of the diverter wall 25. As this bar may be located in different positions on the partition 19 the diverter may thus be made to occupy different positions in regard to the moving belt 17.

The action of the separator with its free roller 42 is by the roller engaging the fruit carried by the belt and diverted by the wall 25 and the board 33 toward the channel 30. If this separator were not used the fruit would be apt to bridge across from the side 25 to the board 33. However, the roller allows the fruit to roll either to one side or the other, and as the fruit rolls readily on the rollers 36 a continuous feed is carried through the channel 30 without there being a jamming or bridging action.

For convenience of manufacture the board 26 fits in a metal channel 44, which channel has the block 32 formed integral therewith and the channel board 31 formed integral with the block. This channel board 31, the block 32, the channel 44, with the board 26 extending through such channel, form the channel through which the fruit is passed in the operation of counting. For convenience of manufacture these parts of the structure are made of metal. A post 45 extends upwardly from the rear portion of the channel 44 and it is to this post that the retaining bar 43 is secured. This retaining bar 43, the side 25, and the guide wall 29, hold this channel structure with the counter elevated above the endless belt.

The pegs used for supporting the casing or tube 27, guide wall 29 and the retaining bar 43, may be in the form of screws which rigidly attach these elements to the structures to which they are attached and, therefore, hold the structure forming the channel of guidance of fruit spaced above the top of the belt 17 which runs underneath these channels.

The counter mechanism is as follows, and has a plate 46 having side extensions 47, these extensions being mounted in journals 48, one being on the channel 44 and the other being on the channel board 31. This plate 46 on one side has a depending end 49 with a blunt point 50. This point rests on a finger 51 of a gauge lever 52, the pivot being at 53. The gauge lever has a slot 54 in which is fitted a stud 55, this stud being secured to the end portion of the channel 44 on the outside. A pointer 56 operates over a scale 57 so that the gauge lever may be adjusted to different sized fruit, and the plate 46 is pulled downwardly by a tension spring 58 secured to a pivot pin 59 mounted on the end of the plate 46 and to a fixed position 60 on the channel 44.

The striker arm 61 is pivoted on the pivot pin 59 and this striker has down turned side pieces 62 with a roller 63 fitted between such side pieces. The roller at one side is provided with a ratchet 64 which is engaged by a pawl 65 attached to one of the side pieces 62 and operated by a compression spring 66 to engage the ratchet. This allows the rotation of the roller 63 in one direction for passing of the fruit but prevents rotation in the opposite direction. The opposite end of the striker arm has a tension spring 67 connected thereto and this is attached at its upper end 68 to a column 69 which extends upwardly from the forward end of the channel 44. This column carries a conventional counter 70 and from this counter there is a link 71 which extends to a secondary lever 72, which lever is pivoted at 73 on the striker lever 61. The slip connection between the striker lever 61 and the secondary lever 72 is by means of a yoke 74 (note Fig. 6) which is made of metal and has a lateral extension 75 secured to the striker 61. This yoke has a pair of spring arms 76 which fit on opposite sides of the secondary lever 72. It will be noted, referring particularly to Fig. 3, that this secondary lever is on one side of the striker 61. A stop bracket 77 is mounted on the block 32 and limits the pivotal movement of the striker roller 63 downwardly.

The action of the counter mechanism above detailed is as follows:

Presuming fruit has been fed into the out-feeding channel, being separated and diverted by the roller 42, which fruit, on account of passing through the sizer, in each section of the counter is substantially the same diameter in one direction at least, but it may be of greater or less diameter in another direction if the fruit is not spherical, and for some types of fruit, especially in some types of oranges, the fruit is not spherical. As the spring 67 lifts the rear end of the striker lever 61 it depresses the roller 63, but there is a limit to the movement of the secondary lever 72 on account of its connection by the link 71 to the counter. Therefore, this lever has the slip or sliding connection through the yoke 74 with the striker lever. The fruit passing underneath the roller shifts this upwardly, and usually the spring pressure between the arms 76 of the yoke is sufficient to depress the secondary lever 72, thus pulling down on the link 71 and actuating the counter for each of the fruit passed through the outfeeding channel. However, should the fruit be of irregular size for passing through the channel and having one portion giving the striker arm a greater motion than spherical fruit, the end of the striker lever adjacent the spring 67 will be depressed to such an extent that it is forced over the secondary lever 72, and, in fact, the upper part of the yoke may contact with this lever and thus force the secondary lever downwardly to operate the link 71 and thus tally the count.

As above mentioned, the approximate regulation of the striker lever is obtained by adjusting the gauge lever 52 in relation to the scale 57 and the pointer 56, this action raising or lowering the plate 46 by engagement of the end 50 being operated on by the finger 51. The action of this finger is to lift or lower the plate 46 which, as above mentioned, is pivoted at the journal 48. Thus the movement of the plate 46 up and down shifts the pivot point 59 of the striker 61 and this regulates the action of this striker lever for fruit of nonspherical form passing under the roller of the striker.

One of the functions of the roller 63 on the striker arm is to allow the free passage of the fruit carried by the endless belt under the arm of the striker without scraping on the fruit. This is done as in certain types of fruit, as oranges, there is a protective wax coating which might be scratched or scraped by a slipping engagement with the fruit and when such protective coating is removed the fruit is apt to rapidly deteriorate. The ratchet and pawl 64 and 65 prevent the rollers from reverse rotation and function to prevent rolling of spherical fruit which might occur due to the action of the moving belt in moving the bottom part of the fruit, and if the roller were free to rotate some of the individual articles might stop at the striker and continuously rotate, driven by the belt, and rotate against the roller operating in the reverse direction, but as the ratchet prevents this reverse rotation the fruit is thrust against the roller of the striker in sufficient force to operate the striker and, therefore, effect a count.

Various changes may be made in the details of construction without departing from the spirit or scope of the invention as defined by the appended claims.

I claim:

1. In a device as described, a structure forming a passage for fruit, means to move fruit through such passage, a shiftable device to engage the fruit in movement through such passage, a counter, and mechanical means having a slip connection between said shiftable device and counter for actuating the counter by such device.

2. In a device as described, means for moving fruit in one direction, a movable device for engaging the fruit in such movement, a counter, and mechanical means having a slip connection between said movable device and the counter to actuate the counter by the movement of the said device.

3. In a device as described, means to move fruit in one direction, a pivotally mounted striker having means to engage fruit and cause the shifting of the striker, a counter, and mechanical means having a slip connection between the counter and the striker to actuate the counter by the movement of the striker in one direction.

4. In a device as claimed in claim 3, having in addition manually operative means to shift the position of the pivot of the striker to accommodate fruit of different sizes.

5. In a device as claimed in claim 3, having means to limit the movement of the said slip connection between the counter and the striker, and means including said limiting means to shift the pivotal point of the striker when such striker engages oversized fruit.

6. In a device as described, means to move fruit in one direction, a movable pivot, a striker arm oscillating on said pivot and having means to engage fruit, the movement of the fruit shifting this striker, a counter, a secondary lever connected to the striker with a slip connection therewith, a link connection from the secondary lever to the counter, and mechanical means having means to shift the position of the pivot to accommodate fruit of various sizes.

7. In a device as claimed in claim 6, the striker and the secondary lever having a yoke connection forming the slip connection, and means actuated by the fruit to shift the pivot when said levers engage the said limit of said slip connection.

8. In a device as described, a structure having a passage for fruit, means to move fruit in one direction through said passage, a structure having a pivot pin mounted therein, a striker arm oscillating on said pivot and having means to engage fruit, a counter, means forming a slip connection with a limit to motion between the striker arm and the counter, and means actuated by the fruit to shift the position of the said pivot on the striker arm engaging oversized fruit and the slip connection moving to its limit.

9. In a device as claimed in claim 8, having in addition a gauge device for manually moving the said pivot to adjust the said pivot and striker arm to fruit of a predetermined size.

10. In a device as described, a structure having a channel open at the bottom for the passage of fruit, a moving belt for conveying fruit through the said channel, a plate pivoted to the top of said channel and having a pintle therein, a striker arm mounted on said pintle and having means to engage fruit, a counter, a secondary lever pivoted to the striker arm and having a slip connection therewith with a motion limit, the said plate being adapted to tilt when the striker arm engages oversized fruit, and the slip connection being moved to its limit thereby raising the said pintle, and an operative connection between the secondary lever and the counter.

11. In a device as claimed in claim 10, having in addition a gauge device comprising a gauge lever pivotally mounted on the channel structure and having a finger to raise and lower the said plate to adjust the pintle and the striker arm to fruit of a predetermined size.

12. In a device as described, a moving, endless belt, a first wall structure extending somewhat longitudinally of the belt, a second wall structure extending somewhat transversely to the belt, means forming a passage for fruit between the said wall structures, a counter connected to the passage with means to actuate said counter by movement of the fruit through the passage, and adjustable means to support the walls, the passage structure, and the counter for longitudinal and lateral adjustment above the said belt.

13. In a device as claimed in claim 12, a separating means positioned in front of said passage and adapted to divert fruit on opposite sides of said means.

14. In a device as described, the combination of a moving, endless belt, a first wall extending somewhat longitudinally of the belt, a second wall extending somewhat transversely to the belt, a channel structure connecting said walls and forming a passage for fruit, a striker device mounted in said channel to engage fruit, a counter actuated by said striker, means to support the said walls, the channel, and striker above the belt, a separating arm extending forwardly from the channel and having a diverting means to engage fruit and prevent jamming at the entrance to said channel.

15. In a device as claimed in claim 14, the separating arm having a slot with a roller journaled therein, said roller depending toward the said belt.

16. In a device as described, the combination of a channel structure having parallel side walls open at the bottom, a first guide wall in substantial alignment with one wall of the channel, a second guide wall extending somewhat transversely to the channel and connected to the second wall thereof, a movable striker to engage fruit mounted on the channel, a counter connection to the channel and operated by the said striker, an endless, moving belt, and adjustable means to support the channel and the guide walls for longitudinal and lateral adjustment above the said belt.

17. In a device as claimed in claim 16, the said transverse guide wall having rollers mounted thereon adjacent the channel, a separating arm extending forwardly from the channel and having a separating roller adjustably mounted thereon, the said roller extending downwardly toward the belt.

18. In a device as described a movable conveyor for fruit, a striker having a cylindrical roller to engage the fruit, and means to prevent reverse rotation of the said roller when engaged by fruit moved by the conveyor.

19. In a device as described, means to convey fruit, a striker, a counter operatively connected thereto, said striker having a roller to engage fruit and allow passage of the fruit under the roller, and means to prevent reverse rotation of said roller when engaged by the fruit.

20. In a device as described, an inverted channel-shaped structure open at the bottom having means for passing fruit through said channel, the upper portion of the channel having a pivoted striker arm mounted to engage the fruit, and a counter operatively connected to said striker arm, the operative connection to the striker arm comprising a secondary lever connected to the counter, and a slip connection between the striker arm and the said lever.

21. In a device as claimed in claim 20, means to adjust the pivotal point of the striker arm to accommodate different sizes of fruit, means operated by the striker arm in engaging oversized fruit to raise the pivot on which said arm is mounted.

22. In a device as described, a wide conveying belt, a channel structure forming a passage for fruit positioned above the belt and adjustable to different positions longitudinally and laterally over such belt, a striker arm pivotally mounted on said structure and having an end extending downwardly toward the belt to engage fruit moved thereby, a counter, and an operative connection between the striker arm and the counter.

23. In a device as described, the combination of a wide conveying belt, an inverted channel structure, means to support said structure above the belt and to adjust it to different positions longitudinally and laterally over the belt, a striker arm pivotally mounted on the channel structure having a depending end to engage fruit passing through the channel, a secondary lever pivoted to the striker arm and having a slip connection therewith, and a counter operated by the secondary lever.

24. In a device as claimed in claim 23, means to adjust the pivot of the striker arm to accommodate fruit of different sizes, and means actuated by the striker arm in engaging oversized fruit to raise the pivot of said striker arm.

25. In a device as described, the combination of a wide belt for conveying fruit, an inverted channel-shaped structure, means to support said structure above and longitudinally and laterally adjustable in relation to the belt, a plate adjustably mounted on the channel structure and having a striker arm pivotally connected thereto, said arm having a depending end extending into the channel to engage fruit and to be operated thereby, means to adjust said plate to accommodate fruit of different sizes, and means operated by the striker arm on engaging oversized fruit to shift said plate and hence the pivot of the striker arm, a counter, and an operative connection from the striker arm to the counter.

26. In a device as claimed in claim 25, said plate being pivoted to the channel structure, and the striker arm being pivoted to the opposite end thereof, the connection to the counter comprising a secondary lever pivoted to the striker arm and extending over said plate, with a slip connection between the striker arm and the secondary lever.

27. In a device as described, an endless moving belt, a channel-shaped structure, means to support said structure above and longitudinally and laterally adjustable relative to the belt, said belt being wider than the channel, the channel having a guiding wall for fruit extending along one side at the intake end, and a second guiding wall on the opposite side of the intake substantially transverse to the channel, an arm extending forwardly of the intake end and having a depending roller to deflect fruit toward said guiding walls.

28. In a device as described, a wide endless moving belt, a structure having a passage with parallel walls extending upwardly above said belt, with means to support said structure above and to adjust same to different positions longitudinally and laterally over the belt, the wall along one side having a forward extension in alignment therewith forming a first guide wall, a second guide wall at the forward end of the opposite wall and at substantially right angles thereto and having a sloping face, a vertical roller, and means to support said roller at the intake end of the passage between the two guide walls to divert fruit thereto, the sloping guide wall having a series of rollers.

29. In a device as described, a stationary confining structure forming a path with means to move articles therethrough, a striker arm having an upper section pivotally mounted and a section extending downwardly therefrom, the downwardly extending section having a roller rotatably mounted at its lower end, a pawl and ratchet device to permit rotation of the roller in one direction and to prevent rotation of the roller in an opposite direction, a reciprocating link, and means actuated by the striker arm to reciprocate such link.

CLARENCE L. HOBART.